United States Patent
Heller

(10) Patent No.: US 9,877,354 B2
(45) Date of Patent: Jan. 23, 2018

(54) PROXY MOBILE NODE CAPABILITY FOR MOBILE IP

(71) Applicant: IPR Licensing, Inc., Wilmington, DE (US)

(72) Inventor: Howard Andrew Heller, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 146 days.

(21) Appl. No.: 14/920,400

(22) Filed: Oct. 22, 2015

(65) Prior Publication Data

US 2016/0050638 A1 Feb. 18, 2016

Related U.S. Application Data

(63) Continuation of application No. 11/601,891, filed on Nov. 20, 2006, now Pat. No. 9,179,431, which is a
(Continued)

(51) Int. Cl.
*H04W 80/04* (2009.01)
*H04W 8/26* (2009.01)
(Continued)

(52) U.S. Cl.
CPC ............ *H04W 80/04* (2013.01); *H04W 8/26* (2013.01); *H04W 60/00* (2013.01); *H04W 68/00* (2013.01); *H04W 88/182* (2013.01)

(58) Field of Classification Search
CPC ........ H04W 80/04; H04W 8/26; H04L 63/164
See application file for complete search history.

(56) References Cited

U.S. PATENT DOCUMENTS 5,325,362 A 6/1994 Aziz
5,400,338 A 3/1995 Flammer, III
(Continued)

FOREIGN PATENT DOCUMENTS

EP 0182417 5/1986
EP 0328100 8/1989
EP 0483547 5/1992

OTHER PUBLICATIONS

Cohen, Danny, et al., "IP Addressing and Routing in a Local Wireless Network," Proceedings of the IEEE Infocom '92 Conference on Computer Communications, Florence, Italy, May 4-8, 1992, vol. 2, pp. 0626-0632, XP00300088.
(Continued)

*Primary Examiner* — Raj Jain
(74) *Attorney, Agent, or Firm* — Volpe and Koenig, P.C.

(57) ABSTRACT

A method and system are provided for transmitting information in a Mobile Internet Protocol (IP) environment, which includes a home agent (HA) provided at a home network, a base station (BS) broadcasting a pilot signal, a foreign agent (FA) provided at or associated with the BS, a mobile node (MN) providing the ability to detect and identify itself to a BS, a proxy mobile node (PMN) Identifying the MN wherein the PMN is provided at the BS. If the PMN identifies the MN, the PMN retrieves an IP address for each of the MN, FA and HA and sends a registration request to the FA. The FA relays the registration request to the HA, and the proxy MN is registered with the HA. Thus, the MN functionality is provided transparently to the MN by the PMN. This significantly simplifies the configuration of the MN and the Mobile IP network.

18 Claims, 4 Drawing Sheets

Related U.S. Application Data continuation of application No. 09/826,060, filed on Apr. 4, 2001, now Pat. No. 7,139,833.

(51) Int. Cl.
*H04W 60/00* (2009.01)
*H04W 68/00* (2009.01)
*H04W 88/18* (2009.01)

(56) References Cited

U.S. PATENT DOCUMENTS

| | | | |
|---|---|---|---|
| 5,708,655 A | 1/1998 | Toth et al. | |
| 5,946,618 A | 8/1999 | Agre et al. | |
| 6,061,650 A | 5/2000 | Malkin et al. | |
| 6,230,012 B1 | 5/2001 | Willkie et al. | |
| 6,256,300 B1 | 7/2001 | Ahmed et al. | |
| 6,304,753 B1 | 10/2001 | Hartmaier | |
| 6,400,722 B1 | 6/2002 | Chuah et al. | |
| 6,442,616 B1* | 8/2002 | Inoue | H04L 29/12311 455/432.1 |
| 6,449,272 B1 | 9/2002 | Chuah et al. | |
| 6,456,604 B1 | 9/2002 | Lee et al. | |
| 6,466,964 B1* | 10/2002 | Leung | H04L 63/08 709/202 |
| 6,473,411 B1 | 10/2002 | Kumaki et al. | |
| 6,473,413 B1 | 10/2002 | Chiou et al. | |
| 6,484,211 B2 | 11/2002 | Turumen | |
| 6,487,406 B1 | 11/2002 | Chang et al. | |
| 6,571,289 B1* | 5/2003 | Montenegro | H04L 63/029 709/227 |
| 6,594,706 B1 | 7/2003 | DeCoursey et al. | |
| 6,647,001 B1 | 11/2003 | Bhagavath et al. | |
| 6,658,258 B1 | 12/2003 | Chen et al. | |
| 6,683,871 B1 | 1/2004 | Lee et al. | |
| 6,697,627 B1 | 2/2004 | Ueno | |
| 6,707,809 B1 | 3/2004 | Warrier et al. | |
| 6,711,147 B1 | 3/2004 | Barnes et al. | |
| 6,742,036 B1 | 5/2004 | Das et al. | |
| 6,760,444 B1 | 7/2004 | Leung | |
| 6,795,857 B1 | 9/2004 | Leung et al. | |
| 6,816,912 B1 | 11/2004 | Borella et al. | |
| 6,947,400 B2 | 9/2005 | Heller | |
| 6,947,401 B2 | 9/2005 | El-Malki et al. | |
| 6,977,938 B2 | 12/2005 | Alriksson et al. | |
| 6,982,967 B1 | 1/2006 | Leung | |
| 7,068,640 B2 | 6/2006 | Kakemizu et al. | |
| 7,106,710 B1* | 9/2006 | Smith | H04W 8/04 370/331 |
| 7,139,833 B2 | 11/2006 | Heller | |
| 7,152,238 B1 | 12/2006 | Leung et al. | |
| 2001/0012777 A1 | 8/2001 | Igarashi et al. | |
| 2001/0041571 A1 | 11/2001 | Yuan | |
| 2001/0046223 A1 | 11/2001 | Malki et al. | |
| 2002/0006133 A1 | 1/2002 | Kakemizu et al. | |
| 2002/0018456 A1* | 2/2002 | Kakemizu | H04L 12/4675 370/338 |
| 2002/0026527 A1 | 2/2002 | Das et al. | |
| 2002/0080752 A1 | 6/2002 | Johansson et al. | |
| 2002/0089958 A1 | 7/2002 | Feder et al. | |
| 2002/0101857 A1 | 8/2002 | Heller | |
| 2002/0118656 A1 | 8/2002 | Agrawal et al. | |
| 2002/0141369 A1 | 10/2002 | Perras | |
| 2016/0050638 A1* | 2/2016 | Heller | H04W 8/26 370/331 |

OTHER PUBLICATIONS

Droms, R., "Dynamic Host Configuration Protocol," Network Working Group, Request for Comments (RFC) 2131, (Mar. 1997) XP002149764.

Johnson, David B., et al., "Protocols for Adaptive Wireless and Mobile Networking," IEEE Personal Communications, vol. 3, No. 1, pp. 34-42 (Feb. 1996) XP000554691.

Perkins, Charles E., et al., "DHCP for Mobile Networking with TCP/IP" Proceedings of the IEEE Symposium on Computers and Communications, Alexandria, Egypt, Jun. 27-29, pp. 255-261 (1995). XP002132695.

Perkins, Charles E., et al., "Using DHCP with Computers That Move" Wireless Networks, October, vol. 1, pp. 341-353 (1995) XP000538245.

Solomon, James D., "Mobile IP the Internet Unplugged," (N.J. Prentice Hall PTR), pp. 33-109 (1998).

Goodman, D.J., "Cellular Packet Communications," IEEE Transactions on Communications, vol. 38, No. 8, New York, pp. 1272-1280, Aug. 8 (1990).

Loucks, W.M., et al., "Implementation of a Dynamic Address Assignment Protocol in a Local Area Network," 10th Conference on Local Compute Networks, New York, USA, October, pp. 149-157 (1985).

Retz, D., "TCP/IP: DOD Suite Marches into the Business World," Data Communications, vol. 16, No. 12, November, pp. 209-225 (1987).

Montenegro, G., "Reverse Tunneling for Mobile IP," pp. 1-19 (1998).

Cong, D., et al., "The Definitions of Managed Objects for IP Mobility Support using SMIv2," pp. 1-52 (1996).

Solomon, J., "Applicability Statement for IP Mobility Support," pp. 1-5 (1996).

Perkins, C., "Minimal Encapsulation within IP," pp. 1-6 (1996).

Perkins, C., "IP Encapsulation within IP," pp. 1-14 (1996).

Perkins, C., "IP Mobility Support," pp. 1-79 (1996).

Johnson, et al., "Mobility Support in IPv6," IETF Mobile IP Working Group, pp. 1-115 (Nov. 2000).

* cited by examiner

PROXY MOBILE NODE CAPABILITY FOR MOBILE IP

CROSS REFERENCE TO RELATED APPLICATIONS

This application is a continuation of U.S. patent application Ser. No. 11/601,891 filed Nov. 20, 2006, which is a continuation of U.S. patent application Ser. No. 09/826,060 filed Apr. 4, 2001, which issued as U.S. Pat. No. 7,139,833 on Nov. 21, 2006, the contents of which are hereby incorporated by reference herein.

BACKGROUND

The present invention relates to mobile communications and, more 15 particularly, to achieving proxy mobile node (MN) capability in a Mobile Internet Protocol (IP) infrastructure.

Mobile Internet Protocol (IP) is an infrastructure and methodology for providing node mobility in an Internet environment. It allows transparent routing of IP packets or datagrams to mobile nodes over the Internet, which allows mobile nodes to change their point-of-attachment to a home network or the Internet without changing their IP address. Such a flexible mobility functionality advantageously enhances network performance in telecommunications or wireless applications.

TCP/IP is a set of protocols developed by the U.S. Department of Defense for communications over interconnected, sometimes dissimilar, networks which has become the de facto standard for data transmission over networks, including the Internet. IP (Internet protocol) is the protocol within TCP/IP that governs the breakup of data messages into packets, the routing of the packets from source to destination, and the reassembly of the packets into the original data messages at the destination.

In Mobile IP, each mobile node is identified by its home address, regardless of its current point of attachment or connection to the Internet. A mobile node (MN) is a host or router that changes its points of attachment or connection from one network or subnetwork to another. This change in location occurs without changing its IP address. Thus, the mobile node may continue to communicate with other Internet nodes at any location using its (constant) IP address, assuming link-layer connectivity to a point of attachment or connection is available.

FIG. 1 is a diagram that generally illustrates a Mobile IP network known in the art. Provided in the Mobile IP network are the mobile node (MN) 10, at least two base stations (17 and 19) connected to the Internet, and a home network 27 also connected to the Internet. A radio tower serves each of the base stations, e.g., radio towers 17A and 19A for the base stations 17 and 19, respectively.

MN 10 is shown as including a personal computer (PC 100) of an end user connected with customer premise equipment (e.g., CPE 101 that connects the end user's PC to a wireless network). Customer premise equipment is typically the equipment located at the customer's site which denotes the demarcation point between the customer (or end user) and the service provider, e.g., a T1 line, wireless modem, radio, cable modem, digital subscriber line (DSL) or asymmetric digital subscriber line (ADSL) modems.

The base stations 17 and 19 include Foreign Agent (FA) 170 and 190, respectively. In Mobile IP, a foreign agent is a router on a mobile node's visited network that provides routing services to the mobile node to which it is registered. The Foreign Agent delivers packets or datagrams to the Mobile Node (e.g., MN 10) from the mobile node's home agent (HA) 25 via tunneling through the Internet. A tunnel is a technology that enables one network to send its data over another network's connections. It works by encapsulating a network protocol (such as Mobile IP) within packets carried by the second network. For packets or datagrams sent by a mobile node, the foreign agent can serve as a default router for registered mobile nodes, and provide reverse tunneling if requested.

The home network 27, which could be an ISP or some other address assigning authority, includes the Mobile IP Home Agent (HA) 25 and a server 20. In Mobile IP, a home agent is a router on a mobile node's home network that tunnels packets or datagrams to the MN when it is away from the home location, and maintains current location information for the mobile node. The server 20 is what the end user at the MN is attempting to access, although the end user may be attempting to access a server that is located elsewhere on the Internet.

MN 10 is assigned a Mobile IP address and is responsible for registering it with the Mobile IP home agent (HA 25) at the home network 27. The mobile node functionality of MN 10 ensures that, as the end user moves between base stations (e.g., from MN 10 to MN 10'), the same Mobile IP address for MN 10 is maintained. When the mobile end-user at MN 10 moves from the transmitting range of the base station 19 to that of the base station 17, the MN 10 (through CPE 101) detects the new base station 17 and re-registers with the home agent HA 25. In doing so, it informs the home agent 25 of its new point of attachment, i.e., its new foreign agent FA 170. HA 25 acknowledges the re-registration and updates its files to reflect the new location (namely MN 10') of the end-user in the transmitting range of the base station 17. Once the new registration is complete, HA 25 forwards all Mobile IP packets destined for MN 10 to the new FA 170 instead of the previous FA 190.

FIG. 2 is a flow diagram that illustrates a method for operating the Mobile IP network known in the art as shown in FIG. 1. In step 201, a Mobile IP address is assigned to the MN 10. The base station (BS) 19 (through radio tower 19A) broadcasts a pilot signal within its transmitting range (step 203). Since the MN 10 is within the transmitting range of the BS 19, it detects the pilot signal (step 205), and sends a registration request to the FA 190 at the BS 19 (step 207). The FA 190 relays the registration request by the MN 10 to the HA 25 at the home network 27 (step 209). The MN 10 is then registered with the HA 25 (which can send back an acknowledgment), with the current FA being the FA 190 (step 211). Mobile IP packets or datagrams can then be transmitted between the home network 27 and the MN 10.

In step 213, it is determined whether the MN 10 detects a new base station (BS). Should the end user be mobile and move within the transmitting range of a new BS, e.g. to the position indicated as MN 10', the CPE 101' detects the movement and the control flow goes to step 215. MN 10' then sends a registration request to the new FA 170 at the new BS 17 (step 215). The new FA 170 relays the registration request by the MN 10' to the HA 25 at the home network 27 (step 217). MN 10' is then re-registered with the HA 25, with the current PA now being the new FA 170 (step 219). The re-registration is acknowledged by an acknowledgment signal sent by HA 25 (step 221). The control flow is then directed to step 223.

If in step 213 the MN does not detect a new BS, i.e., the MN 10 is still within the transmitting range of the BS 19, then the control flow is sent directly to step 223. In step 223, data are encapsulated into Mobile IP-packet(s) for transmission between a source and destination, e.g., the MN 10 and the home network 27. If the data are transmitted from the home network 27 to the MN 10, the HA 25 encapsulates the data into Mobile IP packet(s) for transmission (step 223) and forwards them to the current agent, (step 225). If the data are transmitted from the MN 10 to the home network 27, then the foreign agent (FA 190 or FA 170 depending on location) encapsulates the data into Mobile IP packet(s) for transmission and forwards them to the HA 25 (step 225).

The Mobile IP packet(s) are unencapsulated by the agent at the destination into the data as originally transmitted (step 227). If the data are transmitted from the home network 27 to the MN 10, the foreign agent unencapsulates the Mobile IP packets into original data (step 227) and forwards them to the MN 10 (step 229). If the data are transmitted from the MN 10 to the home network 27, then the HA 25 unencapsulates the Mobile IP packets into original data (step 227) and forwards them to the home network 27 (step 229).

The MN functionality described above requires the installation of software in either the PC 100 or the CPE 101 at the MN 10. This requirement leads to the necessity of installing software for the MN (in the PC or the CPE) for every end user of the Mobile IP network. Such a requirement complicates the configuration of PC 100 and CPE 101, and disadvantageously adds burden to deployment of a Mobile IP network. In addition, it adds overhead to the wireless interface by requiring the sending of registration messages on a periodic basis.

Therefore, there is a general need in the art for an improved method and system for communicating information between a source and a destination using Mobile IP. Particularly needed in the art is a Mobile IP methodology and system that simplifies the configuration of the MN and the network infrastructure. Also needed is a Mobile IP network that provides MN functionality without unduly burdening the configuration of the MN.

SUMMARY

The invention provides a method and system for transmitting information between a computer and a server in Mobile Internet Protocol (IP). A particular embodiment of the invention provides a Mobile Internet protocol (IP) network comprising: a home network; a home agent (HA) provided at the home network; a base station (BS) broadcasting a pilot signal; a foreign agent (FA) provided at or associated with the BS; a mobile node (MN) (comprised of a client computer or device and a wireless modem or customer premise equipment (CPE) able to detect a new BS when moved within its range); a proxy mobile node (PMN) identifying the MN wherein the PMN is provided at the BS. The MN first detects a BS and sends the normal link layer messages to the BS identifying itself. The PMN within the BS retrieves Mobile IP information from a database based on the identity of the MN. This information includes an IP address for each of the MN, FA and. HA plus other information needed to perform the mobile IP registration. The PMN sends a registration request to the FA on behalf of the MN, the FA relays the registration request to the HA, and the PMN is registered with the HA. In accordance with the invention, the MN functionality is provided transparently to the MN via the proxy mobile nodes. The network according to the invention further comprises a new base station (BS) and a new foreign agent (FA) provided at or associated with the new BS. A new PMN is provided at the new BS. If the MN then detects a new BS, it first sends the normal link layer messages to the new BS identifying itself. The new PMN within the new BS retrieves Mobile IP information from a database based on the identity of the MN. This information includes an IP address for each of the MN, FA and HA plus other information needed to perform the new mobile IP registration. The PMN sends a registration request to the new FA on behalf of the MN, the new FA relays the registration request to the HA, and the new PMN is registered with the HA.

The invention further provides a method for transmitting information in a Mobile Internet Protocol (IP) network including a mobile node (MN), a base station (BS) and a home network, wherein a proxy mobile node (PMN) is provided at the BS, a foreign agent (FA) is provided at or associated with the BS, and a home agent (HA) is provided at the home network. An exemplary embodiment for the method in accordance with the invention comprises the steps of detecting the BS, identifying the MN by the PMN, retrieving from a database the MN's Mobile IP information including the IP address for each of the MN, FA and HA, sending a registration request to the FA by the PMN, relaying the request to the HA, registering the PMN with the HA, encapsulating the information into at least one Mobile IP packet, forwarding the Mobile IP packet to the FA, unencapsulating the forwarded IP packet into original data, and forwarding the original data to the destination in the Mobile IP network. The exemplary method according to the invention further comprising the steps of determining whether a new base station (BS) including a new proxy mobile node (PMN) is detected. If it is determined that a new base station is detected, then the method according to the invention further provides the steps of identifying the MN by the new proxy mobile node, retrieving from a database the MN's Mobile IP information including the IP address for each of the MN, FA and HA, sending a re-registration request to a new foreign agent (FA) associated with the new BS, relaying the re-registration request to the HA by the new FA, re-registering the new PMN with the HA, encapsulating the information into at least one Mobile IP packet, forwarding the Mobile IP packet to the new FA, unencapsulating the forwarded IP packet into original data, and forwarding the original data to the destination in the Mobile IP network.

As described herein, the registration and re-registration with the HA associated with the home network are transparent to the MN, i.e., so that the MN itself is not required to implement the registration or re-registration with the home agent as it may be mobile, moving from one base station to the next. Instead the proxy mobile node at the base station takes care of this for each mobile node in the area of the base station. This significantly simplifies the configuration of the MN since no additional software needs to be installed for performing the MN functionality, thereby providing a method and system that performs the mobility functions of mobile IP transparently to the MN.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
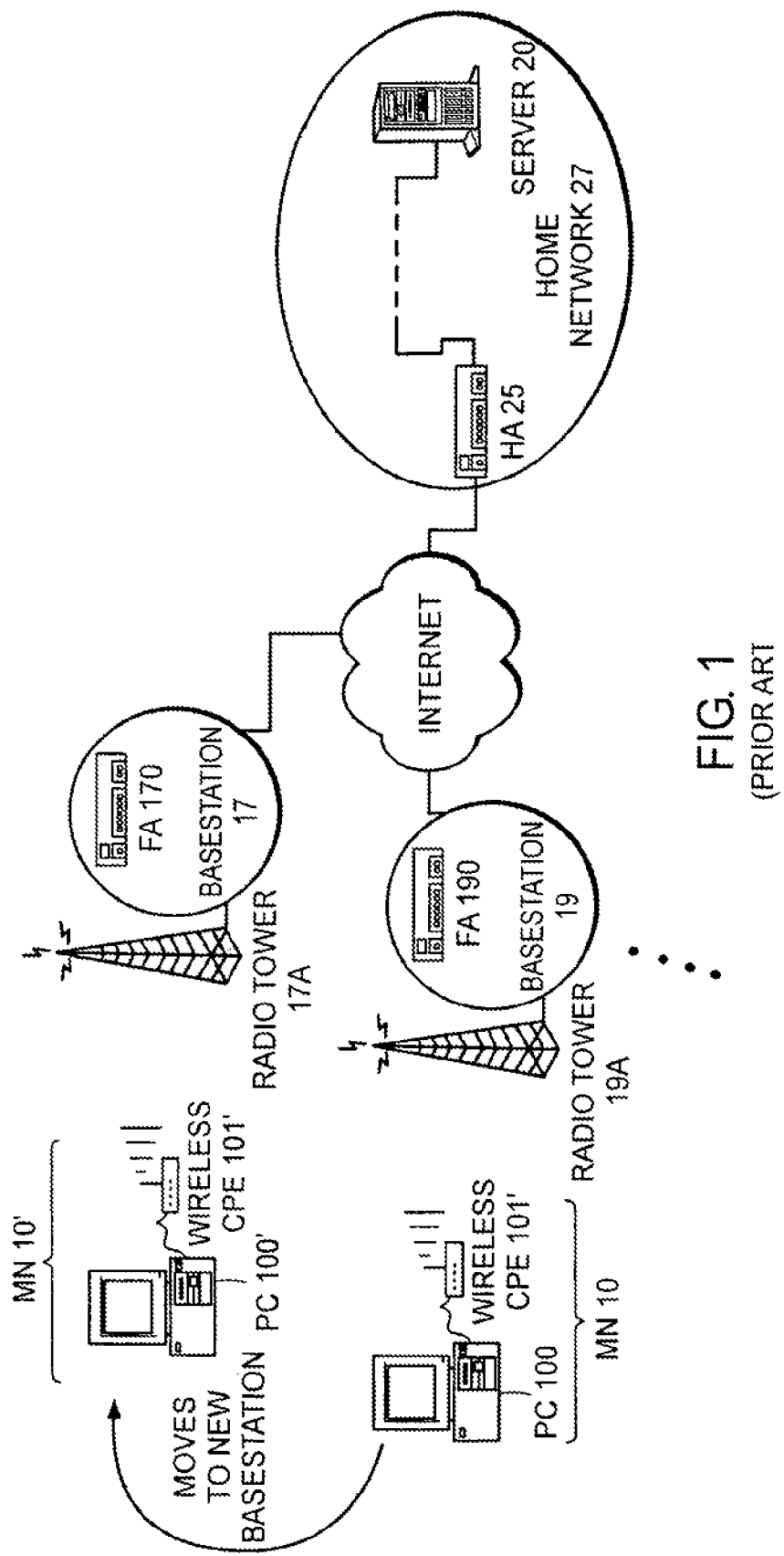
FIG. 1 is a block diagram generally illustrating a Mobile Internet Protocol (IP) network known in the art.
Figure 2:
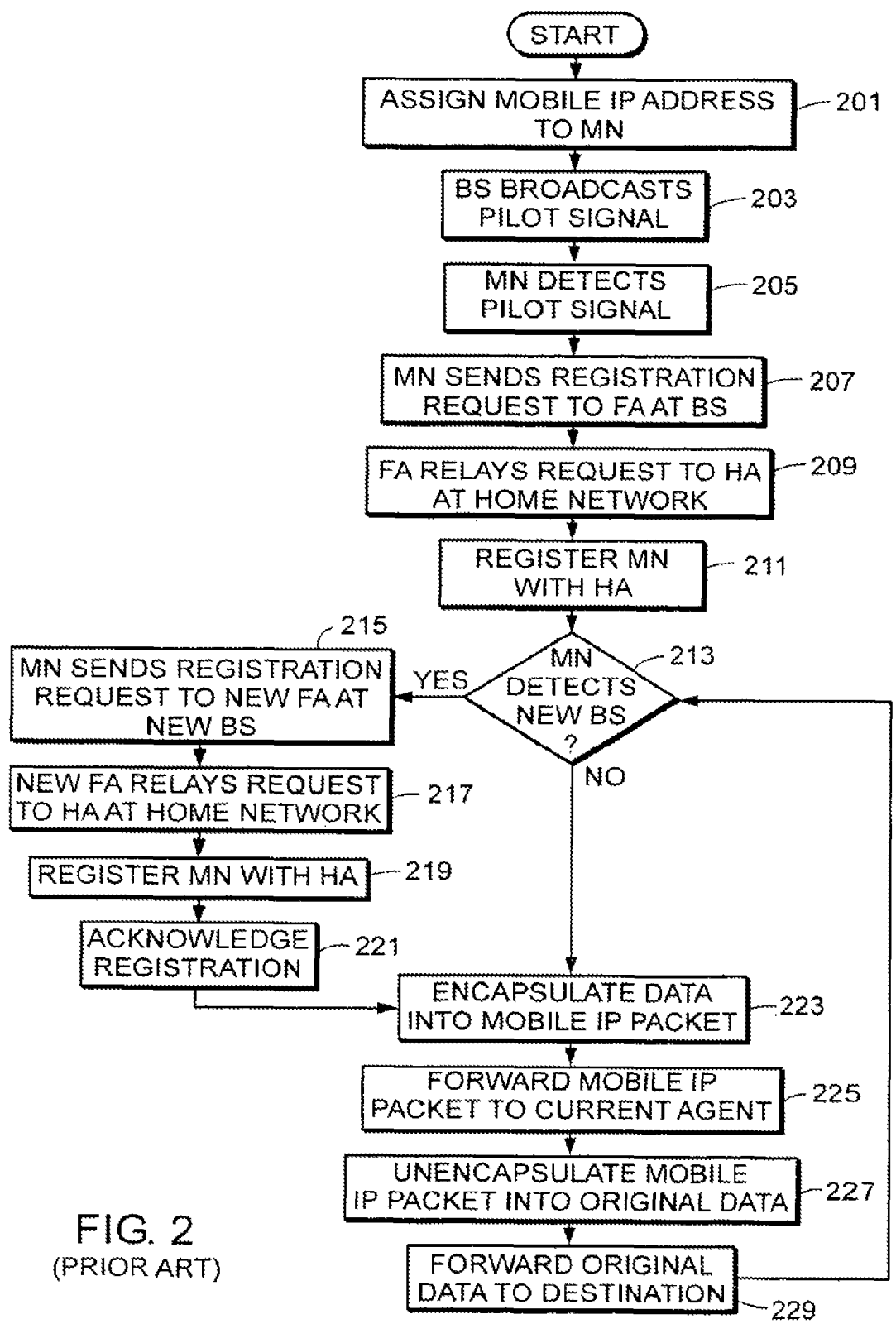
FIG. 2 is a flow chart illustrating a method for operating the Mobile IP network known in the art as shown in FIG. 1.
Figure 3:
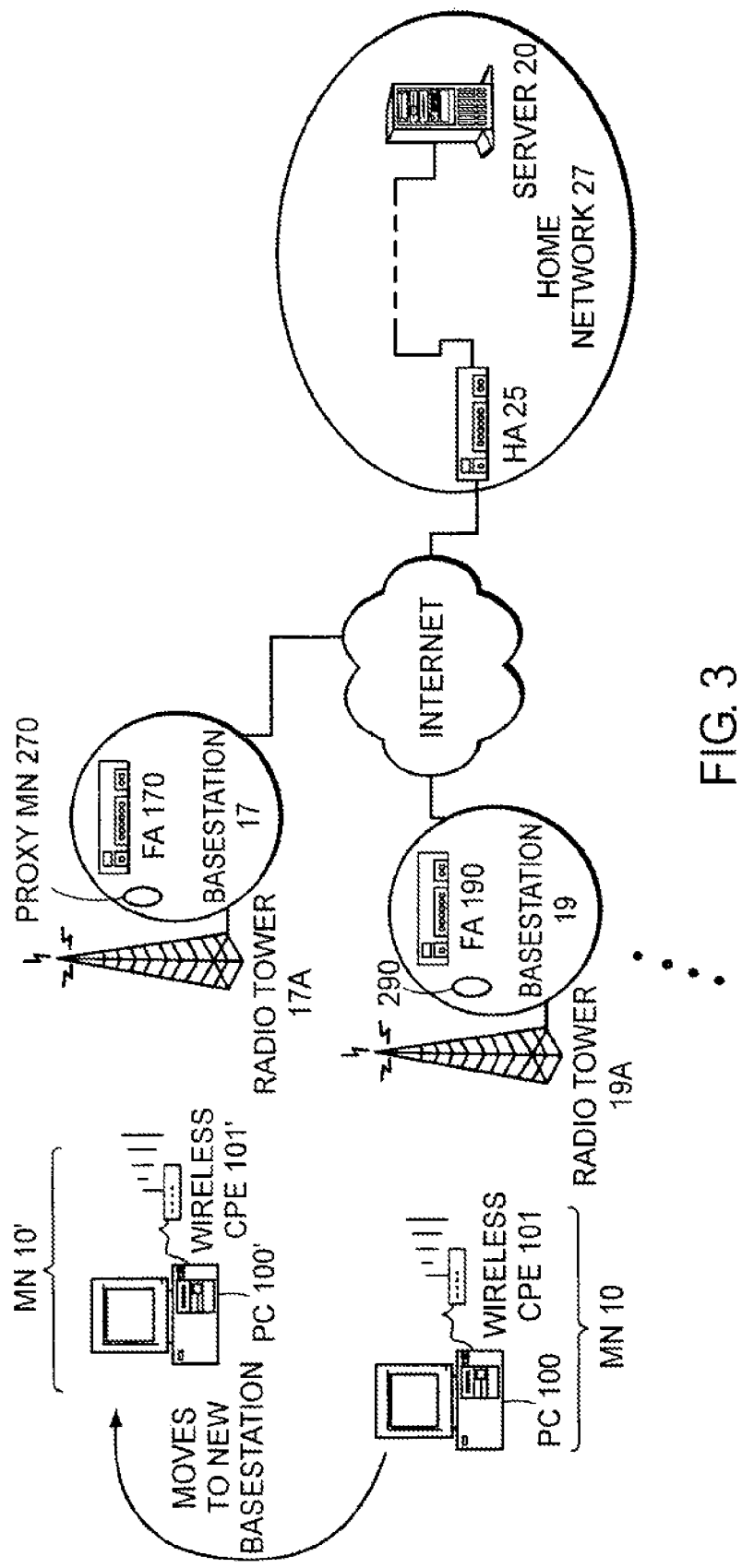
FIG. 3 is a diagram illustrating an exemplary embodiment for the Mobile IP network in accordance with the invention.

FIG. 3 is a diagram that illustrates a particular embodiment of the Mobile IP network in accordance with the invention, which device is similar to that in FIG. 1 and given the same reference number. The exemplary Mobile IP network as shown comprises a home network 27 with a server 20 and a home agent (HA) 25 provided at the home network 27. The system further includes a base station (BS) 19 broadcasting a pilot signal through an associated radio tower 19A, a foreign agent (FA) 190 provided at or associated with the BS 19 and a proxy mobile node (PMN) 290. A proxy is a computer (or the software that runs on it) that performs a function on behalf of another computer (or the software that runs on it). A mobile node (MN) 10 is in the range of BS 19 and detects its pilot signal.

The MN 10, as shown, comprises a personal computer (PC) 100 coupled with customer premise equipment (CPE) 101. The CPE 101 can be a wireless modem, radio, personal digital assistant (PDA) and a mobile telephone.

The PMN 290 identifies the MN 10, retrieves from a database the MN's Mobile IP information including an IP address for each of the MN 10, FA 190 and HA 25, and sends a registration request to the FA 190. The FA 190 relays the registration request to the HA 25, and the PMN 290 is then registered with the HA 25. In accordance with the invention, the MN functionality is provided transparently to the MN 10 by the PMN 290. The database may be memory 295 which is part of the base station 19 or it may be located at any convenient position in the system.

In addition to retrieving from a database 295 the IP addresses for the MN, FA and HA, the proxy mobile node 290 provided at the BS 19 can retrieve the care-of address (which is the IP address for the end of the tunnel, i.e., the destination of the encapsulation and transmission), the mobile-foreign-security information (which is the security association between the MN and the FA), the mobile-home security information (which is the security association between the MN and the HA), the identification field value (which is a 64-bit number used for matching registration requests and acknowledgments), the lifetime value (which is the number of seconds allowed from the original registration before the registration is considered expired), and the current lifetime value (which is the number of seconds remaining before the registration is considered expired). For instance, the lifetime value and the current lifetime value can be useful for the proxy mobile node which monitors the lifetime for each Mobile IP transmission or session. When the lifetime of the Mobile IP session is close to expiring, the PMN 290 sends a new registration request to the HA via the FA to keep the registration current.

The Mobile IP network according to the invention further comprises a further base station (BS) 17 with a further foreign agent (FA) 170 provided at the other BS 17. A new proxy mobile node (PMN) 270 is provided at BS 17. If the MN 10 moves into the position of MN 10' and detects the BS 17, the new PMN 270 sends the normal link layer messages to the BS 17 identifying itself. The new PMN 270 within BS 17 retrieves Mobile IP information from a database 275 based on the identity of the MN. This information includes an IP address for each of the MN 10, new FA 170 and HA 25 plus other information needed to perform the mobile IP registration. The new proxy mobile node 270 sends a registration request to the FA 170, the FA 170 relays the registration request to the HA 25, and the new PMN 270 is registered with the HA 25.

The initial and all subsequent registrations with the HA 25 associated with the home network 27 are transparent to the MN 10, i.e., so that the MN itself is not required to implement the registration with the home agent as it may be mobile, moving from the transmitting range of one base station to the next, e.g., from 10 to 10'. This significantly simplifies the configuration of the MN since no additional software needs to be installed for performing the MN functionality, thereby providing a method and system that performs the mobility functions of mobile IP transparently to the MN. The method of operating the system according to the invention is particularly useful in a wireless environment, where the radio frequency (RF) signaling and link layer messaging between the CPE (e.g., the wireless modem) and the BS can be used as a trigger to the PMN of the BS to perform the MN functionality on behalf of the MN. This in essence provides the mobility functions of Mobile IP transparently to the MN.

It is possible that after the new PMN 270 at a new location (BS 17) registers with the HA 25, and before the old PMN 290 is notified of the move, that the old PMN 290 re-registers with the HA 25 due to its lifetime value expiring. To avoid this race condition, the new PMN 270 can register two times at least 2 seconds apart when a new registration is performed at a BS. This should allow enough time for the old PMN 290 to be notified of the move and discontinue serving the MN 10. Alternatively, the new PMN 270.cndot. can delay registration with the HA until it is instructed that the old PMN 290 has discontinued serving the MN 10.

The MN functionality is advantageously provided to the MN in a transparent 20 fashion, such that the MN may not be configured with the proper IP address for the home network domain. In accordance with the invention, the MN functionality can be provided to the MN transparently even if that the MN is unaware of the HA or what the home network domain is. Such could be the scenario if the wireless service provider is utilizing Mobile IP within their own network to provide mobility, but has other means of assigning an IP address to the MN. For instance, the MN can be connected to a CPE (e.g., a wireless modem) that retrieves a valid IP address from the wireless service provider, e.g., through proprietary messaging. The wireless service provider can locally store pools of IP addresses for each home network domain, or it could query the home network domain for an address using a standard protocol known in the art, such as RADIUS. Once retrieved, the CPE can assign this IP address to the MN through dynamic host configuration protocol or DHCP. DHCP is a TCP/IP protocol that enables a network connected to the Internet to assign a temporary IP address to a host automatically when the host connects to the network. Once the MN is configured with a valid IP address for the home network domain, the proxy MN can begin the registration process. The MN advantageously needs to be configured with the ability to retrieve an IP address through DHCP only.

Figure 4:
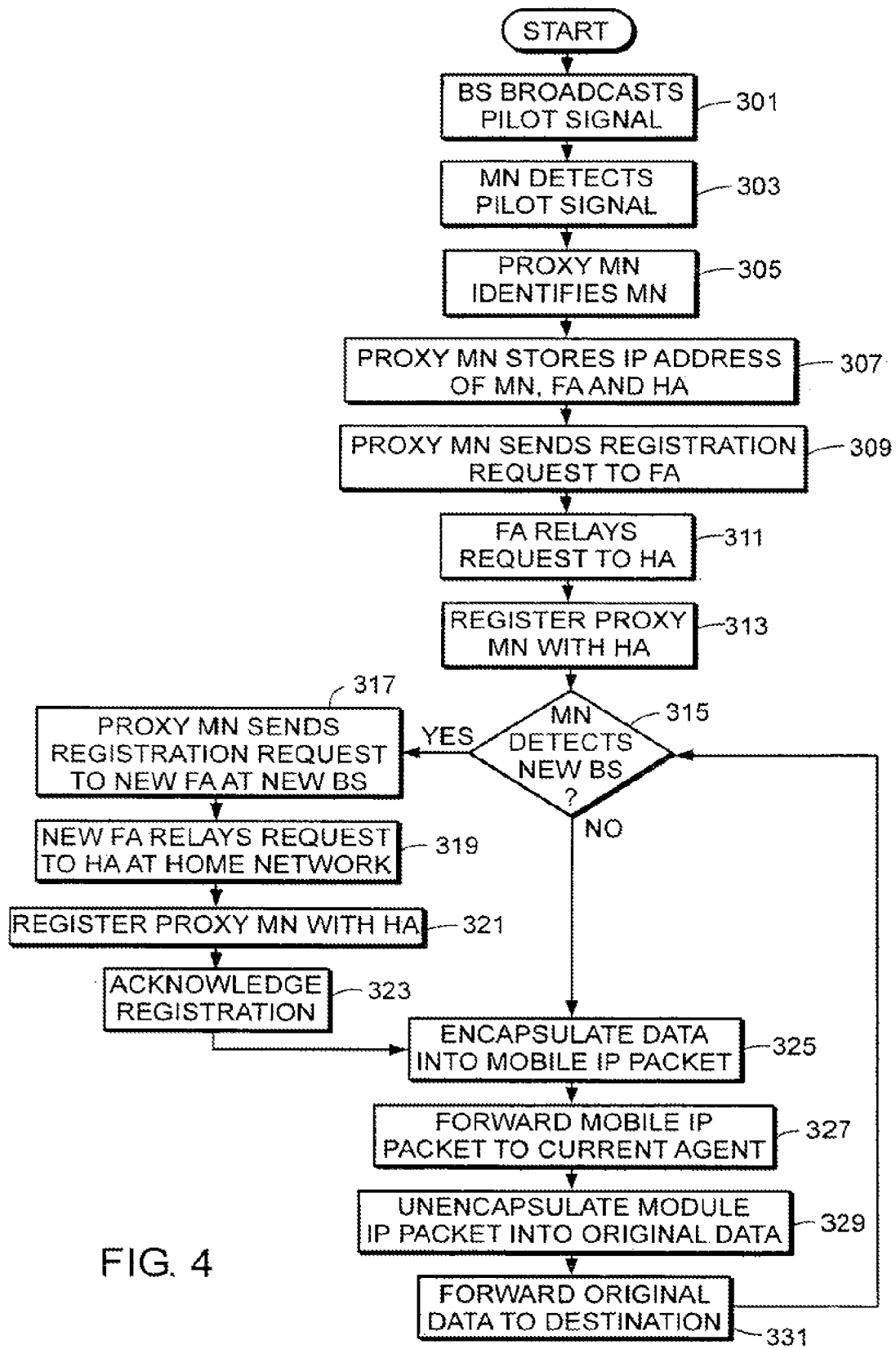
FIG. 4 is a flow chart illustrating an exemplary embodiment o he method for operating the Mobile IP network in accordance with the invention.

FIG. 4 is a flow chart that illustrates an exemplary embodiment of the method for operating the Mobile IP network in accordance with the invention. The exemplary method according to the invention is herein described in conjunction with the exemplary Mobile IP network of FIG. 3.

As the BS 19 (through radio tower 19A) broadcasts a pilot signal (step 301), the MN 10 detects the pilot signal (step 303) as it is within the transmitting range of the BS 19. The PMN 290 provided at the BS 19 identifies the MN 10 (step 305), via normal link layer messages. The PMN 290 within the BS 19 retrieves Mobile IP information from a database 295 based on the identity of the MN. This information includes an IP address for each of the MN 10, FA 190 and HA 25 (step 307) plus other information needed to perform the mobile IP registration. The PMN 290 sends a registration request to the FA 190 (step 309). The FA 190 relays the registration request to the HA 25 (step 311), and the PMN 290 is then registered with the HA 25 (step 313). In accordance with the invention, the MN functionality is provided transparently to the MN 10 via PMN 290.

Since the MN 10 is mobile, it determines whether it detects a new base station (step 315). If the MN 10 detects a new BS, then the control flow is directed to step 317. If the MN 10 does not detect a new BS, then the control flow is directed to step 325.

As the MN moves into the transmitting range of a new BS 17 (MN 10'), the new PMN 270 at the new BS 17 identifies the MN via a normal link layer. The new PMN 270 within the new BS 17 retrieves Mobile IP information from a database 295 based on the identity of the MN. This information includes an IP address for each of the MN 10, new FA 170 and HA 25 plus other information needed to perform the mobile IP registration. The new PMN 270 sends a registration request to the new FA 170 (step 317), the new FA 170 relays the registration request to the HA 25 at the home network 27 (step 319) and the new PMN 270 is registered with the HA 25 (step 321). The registration is acknowledged (step 323). The control flow is then directed to step 325.

In step 327, the Mobile IP Packet(s) are forwarded to the current agent (e.g., the FA 170 or the FA 190). For instance, if the MN remains in the transmitting range of the BS 19 (at MN 10), then the Mobile IP packet(s) are forwarded to the current agent, FA 190. If the MN is in the transmitting range of the BS 17 (at MN 10'), then the Mobile IP packet(s) are forwarded to the current agent, FA 170. In step 325, the data being transmitted in the Mobile IP network are encapsulated into Mobile IP packet(s) at the current FA. The Mobile IP packet(s) are unencapsulated into original data (step 329) which are then forwarded to the destination, e.g., HA 25.

Although the invention has been particularly shown and described in detail with reference to the preferred embodiments thereof, the embodiments are not intended to be exhaustive or to limit the invention to the precise forms disclosed herein. It will be understood by those skilled in the art that many modifications in form and detail may be made without departing from the spirit and scope of the invention. Similarly, any process steps described herein may be interchangeable with other steps to achieve substantially the same result. All such modifications are intended to be encompassed within the scope of the invention, which is defined by the following claims and their equivalents.

While this invention has been particularly shown and described with references to example embodiments thereof, it will be understood by those skilled in the art that various changes in form and details may be made therein without departing from the scope of the invention encompassed by the appended claims.

What is claimed is:

1. A method for use in a base station comprising a mobile internet protocol (MIP) proxy node for transparently providing mobile IP services to a plurality of mobile nodes, the method comprising:
   receiving a signal from a mobile node;
   determining MIP information on behalf of the mobile node, the MIP information including an IP address of an agent associated with the mobile node;
   sending a registration request to the agent on behalf of and transparent to the mobile node; and
   receiving MIP packets from the agent on behalf of the mobile node.

2. The method of claim 1, further comprising:
   transmitting the MIP packets to the mobile node.

3. The method of claim 1, further comprising:
   receiving the MIP packets from the agent via tunneling.

4. The method of claim 1, further comprising:
   identifying the mobile node as a visitor associated with a home network.

5. The method of claim 1, further comprising:
   monitoring a lifetime of a MIP session.

6. The method of claim 1, further comprising:
   monitoring a lifetime of a MIP message.

7. The method of claim 1, further comprising:
   deregistering the mobile node on a condition that the proxy node receives a notification indicating that the mobile node has moved to a new proxy node.

8. The method of claim 1, further comprising:
   identifying the mobile node based on the signal.

9. The method of claim 4, wherein the signal comprises a link layer message.

10. A base station, comprising:
    a mobile internet protocol (MIP) proxy node for transparently providing mobile IP services to a plurality of mobile nodes;
    a receiver comprising circuitry configured to receive a signal from a mobile node;
    circuitry configured to determine MIP information on behalf of the mobile node, the MIP information including an IP address of an agent associated with the mobile node;
    a transmitter comprising circuitry configured to send a registration request to the agent on behalf of and transparent to the mobile node; and
    the receiver further configured to receive MIP packets from the agent on behalf of the mobile node.

11. The base station of claim 10, wherein the transmitter is further configured to transmit the MIP packets to the mobile node.

12. The base station of claim 10, wherein the receiver is further configured to receive the MIP packets from the agent via tunneling.

13. The base station of claim 10, further comprising:
    circuitry configured to identify the mobile node as a visitor associated with a home network.

14. The base station of claim 10, further comprising:
    circuitry configured to monitor a lifetime of a MIP session.

15. The base station of claim 10, further comprising:
    circuitry configured to monitor a lifetime of a MIP message.

16. The base station of claim 10, further comprising:
    circuitry configured to deregister the mobile node on a condition that the proxy node receives a notification indicating that the mobile node has moved to a new proxy node.

17. The base station of claim 10, further comprising:
  circuitry configured to identify the mobile node based on the signal.

18. The base station of claim 10, wherein the signal comprises a link layer message.

\* \* \* \* \*